(12) United States Patent
Dovzhenko et al.

(10) Patent No.: US 12,147,679 B2
(45) Date of Patent: Nov. 19, 2024

(54) MANAGING METADATA OF VARIABLE LENGTH USING METADATA PAGES AND DELTA RECORDS OF TRANSACTION LOG

(71) Applicant: Dell Products L.P., Round Rock, TX (US)

(72) Inventors: Denis Dovzhenko, Saint Petersburg (RU); Svetlana Kalugina, Saint Petersburg (RU); Oleg Soldatenko, Saint Petersburg (RU)

(73) Assignee: Dell Products L.P., Round Rock, TX (US)

( * ) Notice: Subject to any disclaimer, the term of this patent is extended or adjusted under 35 U.S.C. 154(b) by 20 days.

(21) Appl. No.: 18/069,331

(22) Filed: Dec. 21, 2022

(65) Prior Publication Data

US 2023/0384943 A1 Nov. 30, 2023

(30) Foreign Application Priority Data

May 26, 2022 (RU) .......................... RU2022114132

(51) Int. Cl.
*G06F 3/06* (2006.01)

(52) U.S. Cl.
CPC .......... *G06F 3/0619* (2013.01); *G06F 3/0644* (2013.01); *G06F 3/067* (2013.01)

(58) Field of Classification Search
CPC ....... G06F 3/0619; G06F 3/0644; G06F 3/067
See application file for complete search history.

(56) References Cited

U.S. PATENT DOCUMENTS

| | | | |
|---|---|---|---|
| 11,042,296 | B1 | 6/2021 | Shveidel et al. |
| 11,068,199 | B2 | 7/2021 | Shveidel et al. |
| 11,093,169 | B1 | 8/2021 | Shveidel et al. |
| 11,200,219 | B2 | 12/2021 | Shveidel et al. |
| 11,301,330 | B2 | 4/2022 | Shveidel et al. |
| 11,347,725 | B2 | 5/2022 | Shveidel et al. |
| 11,366,795 | B2 | 6/2022 | Love et al. |
| 11,467,963 | B2 | 10/2022 | David et al. |
| 11,468,012 | B2 | 10/2022 | Chinthekindi et al. |
| 11,487,706 | B2 | 11/2022 | Shveidel et al. |
| 2020/0349149 | A1* | 11/2020 | Wang ................. G06F 16/2386 |
| 2021/0405896 | A1* | 12/2021 | Durham ................ G06F 3/0604 |
| 2022/0342589 | A1 | 10/2022 | Dovzhenko et al. |

\* cited by examiner

*Primary Examiner* — Edward J Dudek, Jr.
(74) *Attorney, Agent, or Firm* — BainwoodHuang (57) ABSTRACT

A technique for managing metadata of variable length includes responding to the creation or change in a metadata element by creating at least first and second entries within a metadata page at discontinuous locations. The first entry is located among a first set of regions having uniform length and includes a reference to the second entry, which is located among a second set of regions having variable length. In this manner, the metadata element that does not fit within a fixed-size space is accommodated by multiple discontinuous entries in respective sets of regions.

20 Claims, 9 Drawing Sheets

MANAGING METADATA OF VARIABLE LENGTH USING METADATA PAGES AND DELTA RECORDS OF TRANSACTION LOG

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

A need often arises in storage systems to make small but frequent changes in data elements, such as certain kinds of metadata. Each change may affect only a small number of bytes, but writes to metadata are typically performed on a per-page basis, where a page may contain multiple kilobytes. Thus, writes of small metadata changes can cause significant write amplification, which can be detrimental to flash drives.

Various solutions have been developed for managing large numbers of small but frequent writes, so as to prevent excessive wear in flash drives and to promote write amortization. One solution provides numerous in-memory, sorted buckets that accumulate incremental changes in metadata pages. Once filled, a current set of in-memory buckets may be written to disk and a new set of in-memory buckets may be created, thus forming multiple generations of bucket sets corresponding to respective time ranges. Bucket sets may be queried to identify changes in a particular metadata page, and query results may be merged to construct an up-to-date version of that metadata page.

Some implementations use a transaction log in connection with the above-described buckets. The transaction log contains a time-ordered record of changes made in metadata pages. The metadata changes (deltas) are accumulated in both the in-memory buckets and in the time-ordered transaction log. A rebuild of metadata pages missing from cache will retrieve deltas from in-memory buckets. The transaction log is typically used only if a certain time range is missing from the buckets, e.g., in the event of node failure that may have occurred during that time range.

SUMMARY

Unfortunately, the above-described arrangement of buckets and transaction logs is not well-suited to all types of metadata. For example, metadata pages typically have a fixed layout in which each page is divided into a preset number of fixed-size entries. To create a delta record in the transaction log that corresponds to a metadata change in a page, one can identify the location of the change merely by providing a logical identifier (LI) of the page and an entry identifier (EI) of the specific entry being changed within the page. The above-described arrangement breaks down, however, in cases where metadata changes do not fit into fixed-size regions provided for entries. For example, it has been proposed to use buckets and transaction logs for tracking changes in key-value data, but the keys and/or values of such key-value data can have variable length and do not always fit within the fixed-length spaces provided. What is needed, therefore, is a more flexible layout for metadata pages that allows for variable-length metadata while preserving the ability to translate between entries in bucket pages and delta records in the transaction log.

The above need is addressed at least in part by an improved technique for managing metadata of variable length. The technique includes responding to the creation or change in a metadata element by creating at least first and second entries within a metadata page at discontinuous locations. The first entry is located among a first set of regions having uniform length and includes a reference to the second entry, which is located among a second set of regions having variable length. In this manner, the metadata element that does not fit within a fixed-size space is accommodated by multiple discontinuous entries in respective sets of regions.

Advantageously, the improved technique accommodates metadata elements that do not fit within fixed-size spaces. The technique also enables consistency to be maintained between metadata pages and delta records.

Certain embodiments are directed to a method of managing metadata of variable length. The method includes providing a metadata element and creating a first entry for the metadata element in a metadata page, the first entry located within a first region of a first plurality of regions of the metadata page, the regions of the first plurality of regions having uniform length. The method further includes creating a second entry for the metadata element in the metadata page, the second entry located within a second region of a second plurality of regions of the metadata page, the regions of the second plurality of regions having variable length, wherein the first entry located within the first plurality of regions includes a reference to a location of the second entry within the second plurality of regions.

Other embodiments are directed to a computerized apparatus constructed and arranged to perform a method of managing metadata of variable length, such as the method described above. Still other embodiments are directed to a computer program product. The computer program product stores instructions which, when executed by control circuitry of a computerized apparatus, cause the computerized apparatus to perform a method of managing metadata of variable length, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique for managing metadata of variable length includes responding to the creation or change in a metadata element by creating at least first and second entries within a metadata page at discontinuous locations. The first entry is located among a first set of regions having uniform length and includes a reference to the second entry, which is located among a second set of regions having variable length. In this manner, the metadata element that does not fit within a fixed-size space is accommodated by multiple discontinuous entries in respective sets of regions.

Figure 1:
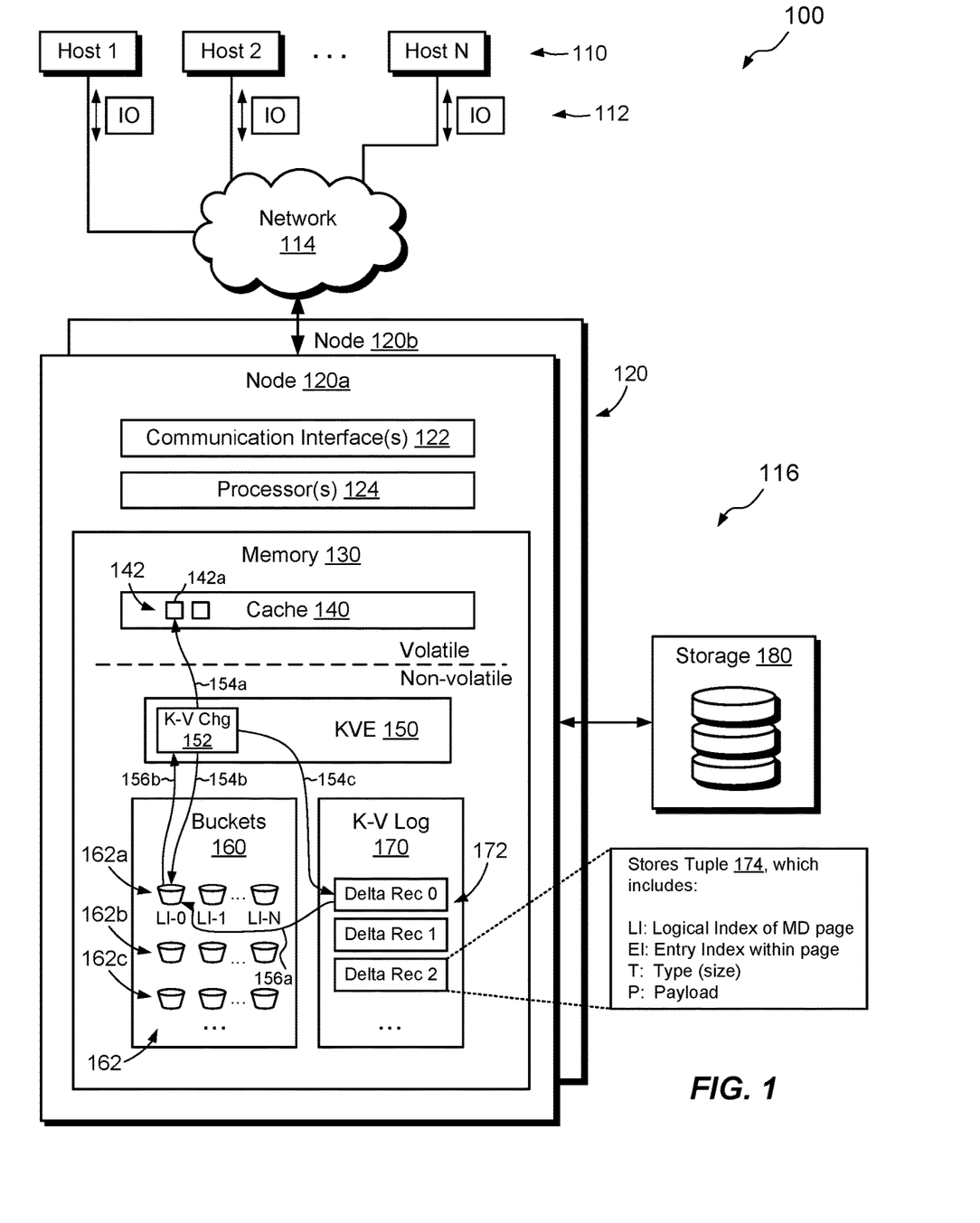
FIG. 1 is a block diagram of an example environment in which embodiments of the improved technique can be practiced.

FIG. 1 shows an example environment 100 in which embodiments of the improved technique can be practiced. Here, multiple hosts 110 are configured to access a data storage system 116 over a network 114. The data storage system 116 includes one or more nodes 120 (e.g., node 120a and node 120b), and storage 190, such as magnetic disk drives, electronic flash drives, and/or the like. Nodes 120 may be provided as circuit board assemblies or blades, which plug into a chassis (not shown) that encloses and cools the nodes. The chassis has a backplane or midplane for interconnecting the nodes 120, and additional connections may be made among nodes 120 using cables. In some examples, the nodes 120 are part of a storage cluster, such as one which contains any number of storage appliances, where each appliance includes a pair of nodes 120 connected to shared storage. In some arrangements, a host application runs directly on the nodes 120, such that separate host machines 110 need not be present. No particular hardware configuration is required, however, as any number of nodes 120 may be provided, including a single node, in any arrangement, and the node or nodes 120 can be any type or types of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the node 120 using various technologies, such as Fibre Channel, iSCSI (Internet small computer system interface), NVMeOF (Non-volatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The node 120 is configured to receive I/O requests 112 according to block-based and/or file-based protocols and to respond to such I/O requests 112 by reading or writing the storage 180.

The depiction of node 120a is intended to be representative of all nodes 120. As shown, node 120a includes one or more communication interfaces 122, a set of processors 124, and memory 130. The communication interfaces 122 include, for example, SCSI target adapters and/or network interface adapters for converting electronic and/or optical signals received over the network 114 to electronic form for use by the node 120a. The set of processors 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a cache 140, a key-value engine (KVE) 150, various buckets 160 (which may also be referred to herein as "tablets"), and a key-value (K-V) log 170. In an example, the cache 140 is realized in volatile memory, whereas the KVE 150, buckets 160, and KV log 170 are realized at least in part in non-volatile memory. For example, the KVE 150, buckets 160, and K-V log 170 may be realized using in-memory objects, which are backed by storage 180 and/or by persistent memory local to the node 120a.

Cache 140 is configured to store cache pages 142, which may include cached versions of metadata pages persisted in storage 180. The cache pages 142 may include pages that store key-value metadata. Such pages may have recently been read from storage 180, for example.

The KVE 150 is configured to manage a key-value store, e.g., a no-SQL database of K-V pairs for which keys are associated with corresponding values. In one example, the KVE 150 stores metadata that keeps track of space accounting in the data storage system 116. Such space-accounting metadata may be updated frequently in small increments, such as every time a write or delete of data is performed. The KVE 150 may store any type of data or metadata, however, which may include system management information, for example.

Buckets 160 store various generations 162 of metadata changes made to key-value data. For example, generation 162*a* may indicate a current generation of metadata changes, whereas generations 162*b*, 162*c*, and so on, may indicate successively previous generations of metadata changes. Once the buckets 160 in the current generation 162*a* are filled, for example, the current generation 162*a* is relabeled as the immediately previous generation and a new current generation is created. In this manner, buckets 160 are kept to manageable sizes. In some examples, the current generation 162*a* is stored in volatile memory, such as cache 140, rather than in non-volatile memory, as shown.

Buckets 160 may be provided for respective metadata pages. For example, bucket LI-0 may correspond to a metadata page with logical index 0, bucket LI-1 may correspond to a metadata page with logical index 1, and so on, up to LI-N, which may correspond to a metadata page with logical index N. Here, the logical index (LI) uniquely identifies the metadata page.

Each bucket 160 may include any number of incremental page updates to a respective page. For example, bucket LI-0 may include multiple incremental updates of the page at logical index 0. Incremental updates to a page may be arranged within a bucket as respective nodes of a B-tree (not shown), for example.

In an example, a metadata page in a bucket 160 may be configured to store multiple K-V pairs managed by KVE 150. It is thus possible that different incremental updates of a metadata page contained in a bucket may correspond to different K-V pairs and/or to multiple updates of the same K-V pair or pairs.

The K-V log 170 is a persistent log that stores and organizes delta records 172 in a time-ordered manner. The delta records 172 store respective updates of metadata pages containing key-value data. For example, each delta record 172 corresponds to a respective instance of a page within a bucket 160. In some examples, multiple delta records 172 correspond to the same instance of a page, e.g., to multiple changes made in the same page.

In an example, delta records 172 are realized using respective sets of elements, such as tuples. For instance, each delta record 172 may be realized as a 4-tuple {LI; EI; T; P}, in which the elements are defined as follows:

LI: the logical index of the metadata page being changed (e.g., 0, 1, 2, etc.).
EI: the entry index within the metadata page where the change is being made (e.g., 1, 2, etc.).
T: a type of metadata change, such as a size of the element being changed.
P: a payload that indicates a new metadata value.

In example operation, the hosts 110 issue I/O requests 112 to the data storage system 116. Node 120*a* receives the I/O requests 112 at the communication interfaces 122 and initiates further processing. For I/O requests 112 that specify changes that affect space accounting, such as writes and deletes, the KVE 150 may update one or more K-V pairs that track such changes. For example, the KVE 150 may identify a change 152 in a particular K-V pair. For the current example, we assume that the K-V pair being changed can be found in the page corresponding to LI-0. As indicated by arrow 154*a*, the KVE 150 may write the change to a page 142*a* in cache 140. As indicated by arrow 154*b*, the KVE 150 may also update the bucket for LI-0 in the current generation 162*a* of buckets, e.g., by creating a new item in bucket LI-0 that implements the change 152. As indicated by arrow 154*c*, the node 120*a* may create a delta record that corresponds to the new item added to bucket LI-0. Here, node 120*a* creates Delta Record 0, e.g., by forming a 4-tuple that identifies the change based on values of LI, EI, T, and P.

An example purpose of creating Delta Record 0 is to support recovery in the event that a cached version 142*a* of the page cannot be found. For example, if page 142*a* is no longer found in cache 140, then the node 120*a* may reconstruct page updates in bucket LI-0, e.g., as shown by arrow 156*a*. Thus, one should appreciate that proper management of K-V data involves both (1) translating a change in an instance of a metadata page to a corresponding delta log 172 and (2) translating a change indicated by a delta log 172 to a corresponding item in a bucket. Note that node 120*a* may also recover the K-V change 152 (arrow 156*b*) if the K-V change 152 is located in volatile memory.

Figure 2:
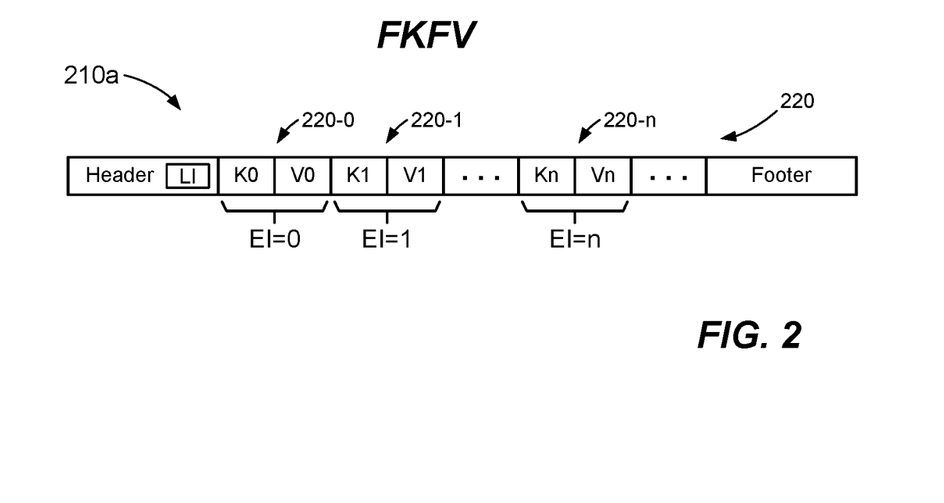
FIG. 2 is a block diagram of an example metadata page in which metadata elements are laid out in fixed-length entries.

FIG. 2 shows an example page 210*a*, such as an instance of a page for which updates are accumulated in bucket LI-0. The depicted example shows a simple case in which the page stores K-V pairs in which keys and values each fit into fixed-size areas of the page 210*a*. As shown, the page 210*a* includes a header and a footer. The header includes the LI (logical index) of the page 210*a*. The page 210*a* is formatted to include multiple fixed-size regions 220-0 through 220-*n*, which correspond to respective entry indices (EI's) 0 through n. Although the page 210*a* is laid out for multiple K-V pairs, each item in a bucket 160 may include only a single K-V pair, i.e., the K-V pair being updated.

Figure 3:
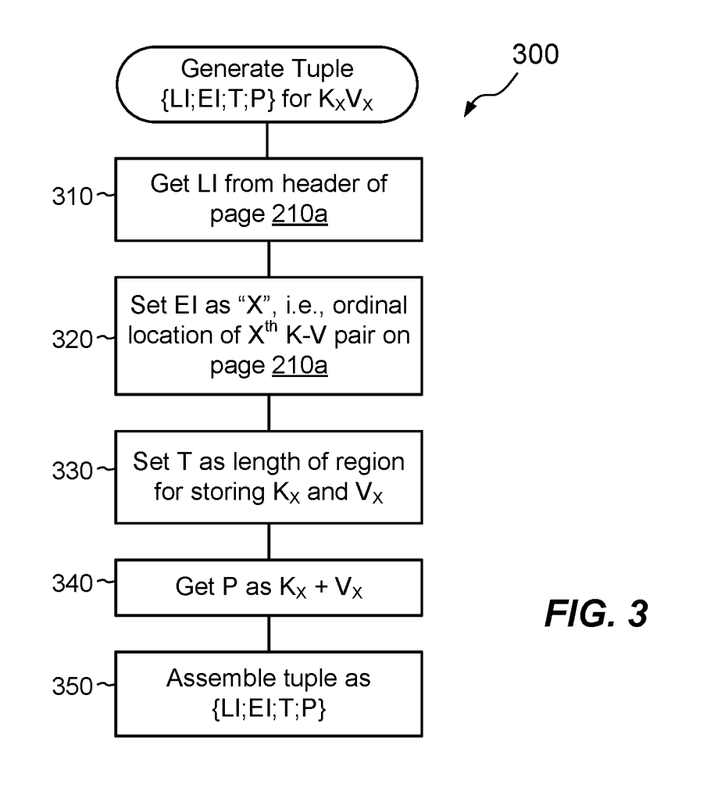
FIG. 3 is a flowchart that shows an example method of creating a delta record from the metadata page of FIG. 2.

FIG. 3 shows an example method 300 of generating a delta record 172 for a particular K-V pair $K_X V_X$ updated in the page 210*a*, where X is any integer between 0 and n. Here, generating the delta record involves forming a tuple {LI; EI; T; P} for $K_X V_X$. At 310, the logical index LI may be obtained directly from the header of page 210*a*. At 320, the entry EI is determined as the ordinal location of the $X^{th}$ K-V pair in page 210*a*. For example, EI equals 0 for $K_0 V_0$, EI equals 1 for $K_1 V_1$, and so on. At 330, the type T is set to the length of the region 220X that stores $K_X$ and $V_X$. In this example, the regions 220 are all the same length so the value of T is the same for all regions. At 340, the payload P is set to the actual data stored in the region 220X, i.e., $K_X + V_X$. Here, the "+" sign indicates a combining function, such as concatenation. Finally, at 350 the complete tuple {LI; EI; T; P} is formed based on the determined values. The acts of method 300 may be carried out in any suitable order.

Figure 4:
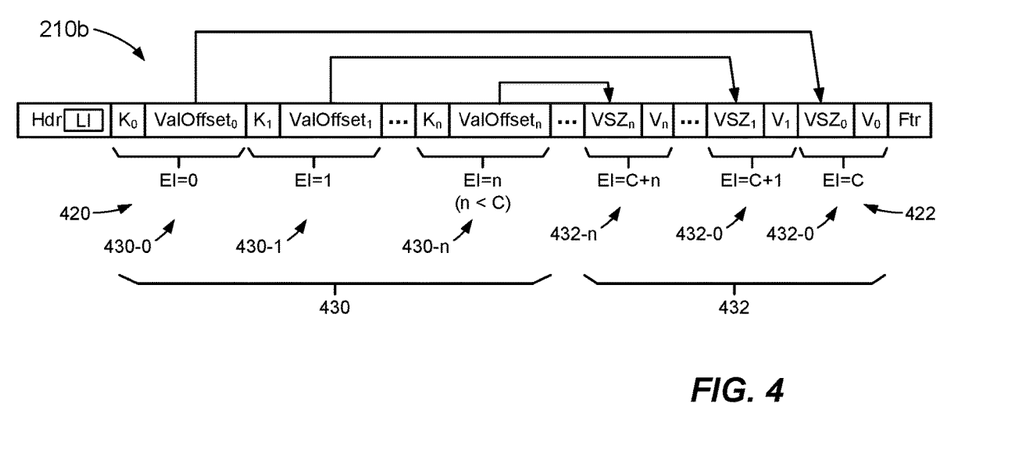
FIG. 4 is a block diagram of an example metadata page in which key-value data is laid out for fixed-length keys and variable-length values.

FIG. 4 shows a more complex arrangement, where an example page 210*b* is configured to store K-V pairs having fixed-length keys but variable-length values, such that K-V pairs may not fit into fixed-length regions like those shown in FIG. 2. In an example, FIG. 4 addresses the placement of variable-length K-V pairs by providing two entries for each K-V pair, a first entry that is fixed in length and a second entry that is variable. The first entry includes a reference to a location of the second entry within the page 210*b*. The first entry has an entry index that falls within a first domain 420 of entry indices, and the second entry has an entry index that falls within a second domain 422 of entry indices. The first and second domains of entry indices 420 and 422 are discontinuous and non-overlapping.

Page 210*b* includes both a first plurality of regions 430 for the first domain 420 of entry indices and a second plurality of regions 432 for the second domain 422 of entry indices. Each region is configured to store a respective entry having a respective entry index. The first plurality of regions 430 includes regions 430-0 through 430-n, and the second plurality of regions 432 includes regions 432-0 through 432-n. The regions in the first plurality of regions 430 are uniform in length, like the regions 220 shown in FIG. 2, but the regions in the second plurality of regions 432 are variable in length. For example, some regions in the second plurality of regions 432 may be larger than the regions in the first plurality of regions 430, whereas other regions in the second plurality of regions 432 may be smaller.

As indicated, the page 210b is configured with first and second domains 420 and 422 of entry indices. The entry indices in the first domain 420 are discontinuous with the entry indices in the second domain 422. For example, the entry indices in the first domain 420 in the first plurality of regions 430 range from 0 to n, whereas the entry indices in the second domain 422 in the second plurality of regions 432 range from C to C+n, where C is a constant integer. Each K-V pair in the page 210b may be stored using a first entry in the first domain 420 and a second entry in the second domain 422, where the first and second entry indices are separated by the constant C. In an example, entries in the second domain 422 are laid out in reverse order, with the lowest-index entry placed closest to the footer and the higher-index entries placed progressively farther away.

In an example, the constant C is selected to be large enough to ensure that there is a discontinuity between the entry indices in the first domain 420 and the entry indices in the second domain 422. For example, C may be assigned based on a length L of the page 210b, such as its length in bytes. Other determinants of C may include the expected sizes of entries, particularly their minimum sizes. A suitable value of C may be L/2, which is sufficient to maintain the desired gap between the two domains, assuming each entry is at least one byte in length.

As further shown in FIG. 4, each entry in the first plurality of regions 430 includes a key of a K-V pair (e.g., $K_X$) and an offset (e.g., $ValOffset_X$) that points to a corresponding value of the K-V pair in the second plurality of regions 432. The size of $K_X$ and $ValOffset_X$ may each be uniform and thus are known without having to provide any extra metadata. Each entry in the second plurality of regions 432 includes the pointed-to value ($V_X$) of a K-V pair and a size of that value ($VSZ_X$). In some arrangements, the reference $ValOffset_X$ in the first entry points to the size $VSZ_X$ of the associated value $V_X$ in the second entry, and the size may precede the value.

Figure 5A:
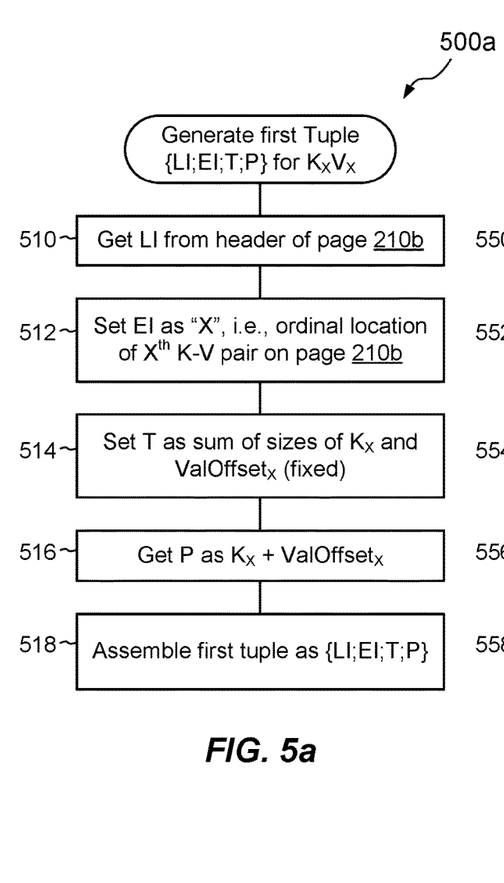
FIGS. 5a and 5b are flowcharts that show example methods of creating delta records from the metadata page of FIG. 4.
Figure 5B:
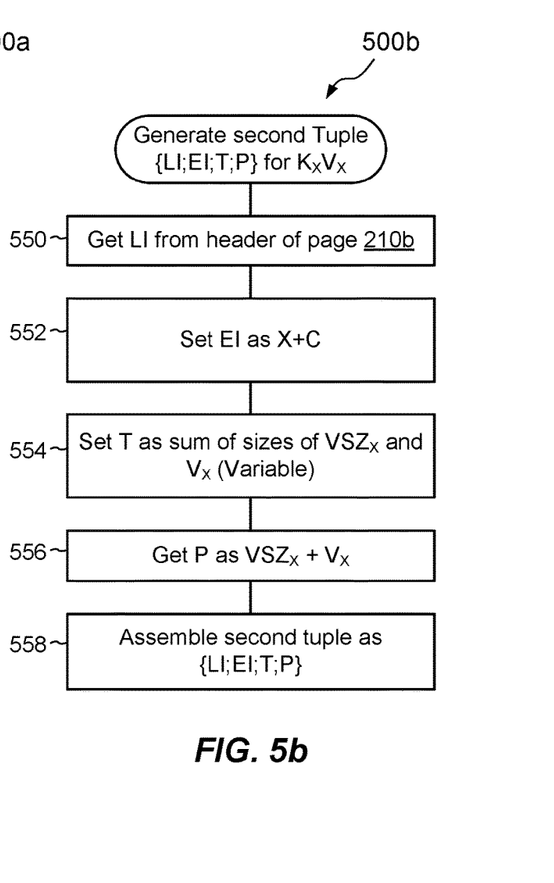

Given that storing K-V pairs having fixed-length keys and variable-length values entails the creation of both first and second entries in the page 210b, generating corresponding changes in the K-V log 170 involves creating two delta records 172, i.e., one delta record for each entry. FIGS. 5a and 5b show example methods for creating such delta records.

FIG. 5a shows an example method 500a for creating a first delta record 172 that corresponds to the first entry. The first entry is the first of two entries in page 210b that store a K-V pair $K_XY_X$, where X is an integer from 0 to n. In an example, creating the first delta record involves generating a first tuple {LI; EI; T; P} for $K_XV_X$. As the first entry falls within the first plurality of regions 430 having uniformly-sized regions, the method for creating the first delta record is similar to the one for creating the delta record in FIG. 3.

For example, at 510 the node 120a obtains the LI for the first delta record from the header of page 210b. At 512, node 120a sets the EI simply as "X", i.e., the ordinal position of the $X^{th}$ K-V pair in page 210b. At 514, the size T is set to the sum of sizes of $K_X$ and $ValOffset_X$. As regions in the first plurality of regions 430 are uniform in size, T may be the same for all entries in the first plurality of regions 430. At 516, node 120a obtains the payload P as $K_X$+$ValOffset_X$ (e.g., with "+" denoting concatenation). At 518, the desired tuple describing the first delta record is assembled based on the determined values of LI, EI, T, and P.

FIG. 5b shows an example method 500b for creating the second delta record corresponding to the second entry used to store the K-V pair $K_XY_X$ in page 210b, e.g., by generating a second tuple {LI; EI; T; P}. At 550, node 120a obtains the LI (as before) from the header of page 210b. At 552, node 120a sets the EI to X+C, where C is the above-described constant, such as L/2. Thus, the EI of the second delta record is just the EI of the first delta record plus C. At 554, the size T is set to the sum of the sizes of $VSZ_X$ and $V_X$. At 556, the payload is set to $VSZ_X$+$V_X$. At 558, the desired tuple describing the second delta record is assembled based on the determined values of LI, EI, T, and P.

The first and second delta records may then be written to the K-V log 172 as related delta records. For example, the first and second delta records may be written to the K-V log 172 adjacently, as part of a single transaction, or in some other way that identifies the two delta records as related. Given that the first delta record encodes the first entry, which includes a reference to the second entry, it is preferable to store the first and second delta records in an order that enables the first entry to be rebuilt prior to the second entry, so that the location of the second entry can be determined based on the reference contained in the first entry. Such writing generally entails writing the first delta record first and the second delta record second, although other arrangements are possible. One should appreciate that the acts of methods 500a and 500b may be carried out in any suitable order.

Figure 6:
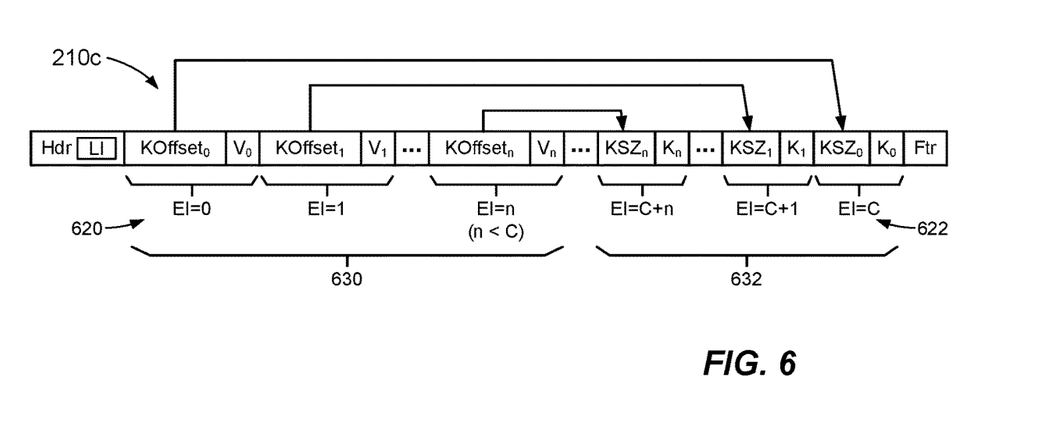
FIG. 6 is a block diagram of an example metadata page in which key-value data is laid out for variable-length keys and fixed-length values.

FIG. 6 shows an example arrangement in which a page 210c is configured to store K-V pairs having variable-length keys and fixed-length values. Once again, such K-V pairs may not fit into fixed-length regions like those shown in FIG. 2. As in FIG. 4, the placement of variable-length K-V pairs is addressed by providing two entries for each K-V pair, a first entry that is fixed in length and a second entry that is variable. The first entry includes a reference to a location of the second entry within the page 210c. The first entry has an entry index that falls within a first domain 620 of entry indices, and the second entry has an entry index that falls within a second domain 622 of entry indices. The first and second domains of entry indices 620 and 622 are discontinuous and non-overlapping.

The first domain 620 of entry indices is provided within a first plurality of regions 630, and the second domain 622 of entry indices is provided within a second plurality of regions 632. One entry may be provided in each region.

As shown, each entry of the first domain 620 in the first plurality of regions 630 may include a key offset ($KOffset_X$) of a key of a K-V pair $K_XV_X$ and a corresponding value ($V_X$). The size of $KOffset_X$ and $V_X$ may each be uniform and thus known without having to provide any extra metadata. The corresponding entry in the second domain 622 in the second plurality of regions 632 may include a key size ($KSZ_X$) of the key of $K_XV_X$ and the key itself, $K_X$. The key offset $KOffset_X$ in the first entry points to key size $KSZ_X$ in the second entry.

Figure 7A:
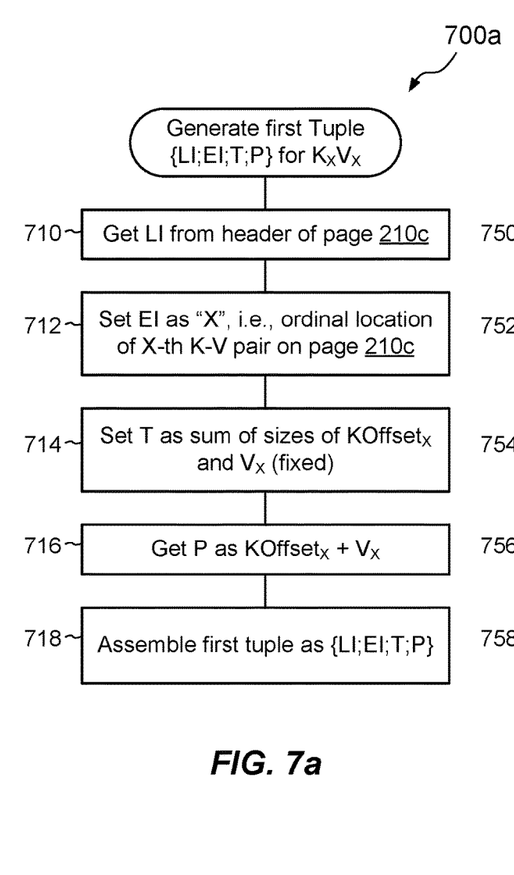
FIGS. 7a and 7b are flowcharts that show example methods of creating delta records from the metadata page of FIG. 6.
Figure 7B:
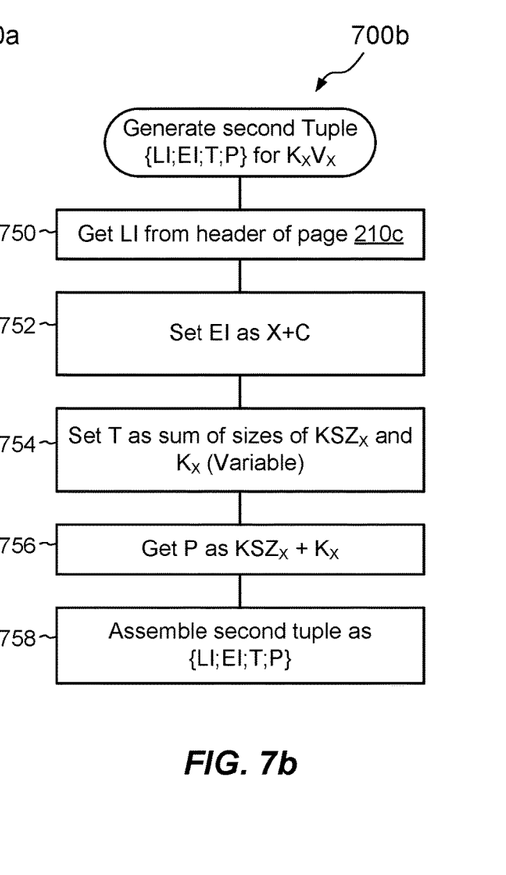

Given that both the first and second entries are created in page 210b to accommodate K-V pairs having variable-length keys and fixed-length values, generating corresponding changes in the K-V log 170 involves creating two delta records 172, i.e., one delta record for each entry. FIGS. 7a and 7b show example methods for creating such delta records.

FIG. 7a shows an example method 700a for creating a first delta record 172 that corresponds to the first entry used for storing a K-V pair $K_X V_X$. As before, creating the first delta record involves generating a first tuple {LI; EI; T; P} for $K_X V_X$. The first entry falls within the first plurality of regions 630 having uniformly-sized regions.

At 710, the node 120a obtains the LI for the first delta record from the header of page 210c. At 712, node 120a sets the EI simply as "X", i.e., the ordinal position of the $X^{th}$ K-V pair in page 210c. At 714, the size T is set to the sum of the sizes of $KOffset_X$ and $V_X$. As the regions in the first plurality of regions 630 are uniform in size, T may be the same for all entries in the first plurality of regions 630. At 716, node 120a obtains the payload P as $KOffset_X + V_X$. At 718, the desired tuple describing the first delta record is assembled based on the determined values of LI, EI, T, and P.

FIG. 7b shows an example method 700b for generating the second delta record corresponding to the second entry used to store the K-V pair $K_X Y_X$ in page 210c, e.g., by generating a second tuple {LI; EI; T; P}. At 750, node 120a obtains the LI from the header of page 210b. At 752, node 120a sets the EI to X+C, where C is the above-described constant, such as L/2. Thus, the EI of the second delta record is the EI of the first delta record plus C. At 754, the size T is set to the sum of the sizes of $KSZ_X$ and $K_X$. At 756, the payload is set to $KSZ_X + K_X$. At 758, the desired second tuple describing the second delta record is assembled based on the determined values of LI, EI, T, and P. As before, the first and second delta records may be written to the K-V log 172 as related delta records and preferably in an order that enables the first entry to be rebuilt prior to the second entry. One should appreciate that the acts of methods 700a and 700b may be carried out in any suitable order.

Figure 8:
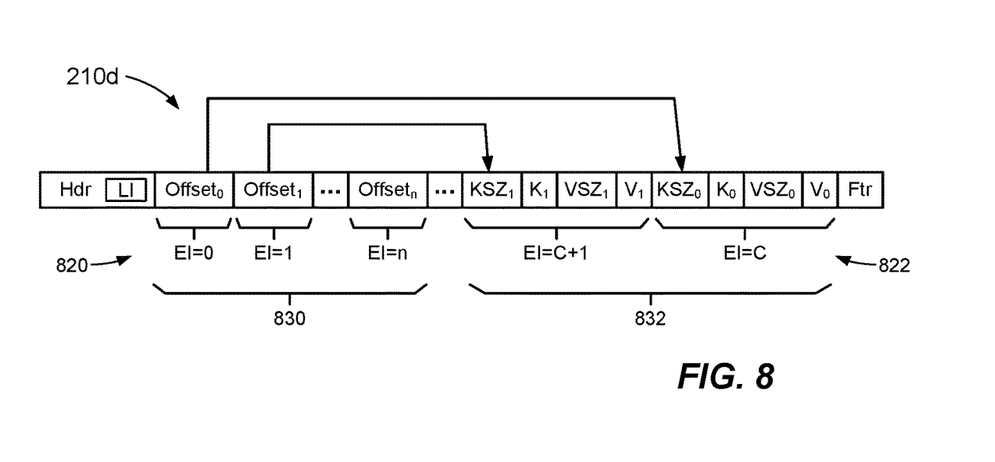
FIG. 8 is a block diagram of a first example metadata page in which key-value data is laid out for variable-length keys and variable-length values.

FIG. 8 shows a first example arrangement in which a page 210d is configured to store K-V pairs having variable-length keys and variable-length values. Once again, such K-V pairs may not fit into fixed-length regions like those shown in FIG. 2. As in FIGS. 4 and 6, the placement of variable-length K-V pairs is addressed by providing two entries for each K-V pair, a first entry that is fixed in length and a second entry that is variable. The first entry includes a reference to a location of the second entry within the page 210d. The first entry has an entry index that falls within a first domain 820 of entry indices, and the second entry has an entry index that falls within a second domain 822 of entry indices. The first and second domains of entry indices 820 and 822 are discontinuous and non-overlapping.

The first domain 820 of entry indices is provided within a first plurality of regions 830, and the second domain 822 of entry indices is provided within a second plurality of regions 832. One entry may be provided in each region.

As shown, a first entry in the first domain 820 may include an offset ($Offset_X$) that points to a corresponding K-V pair $K_X V_X$ stored in a second entry in the second domain 822. The second entry may include a size of the key, $KSZ_X$, the key itself, $K_X$, a size of the corresponding value, $VSZ_X$, and the value itself, $V_X$.

Figure 9A:
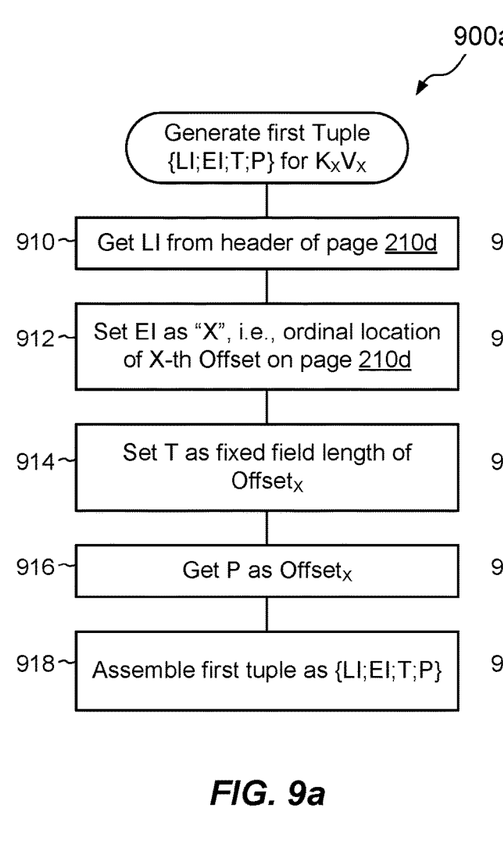
FIGS. 9a and 9b are flowcharts that show example methods of creating delta records from the metadata page of FIG. 8.
Figure 9B:
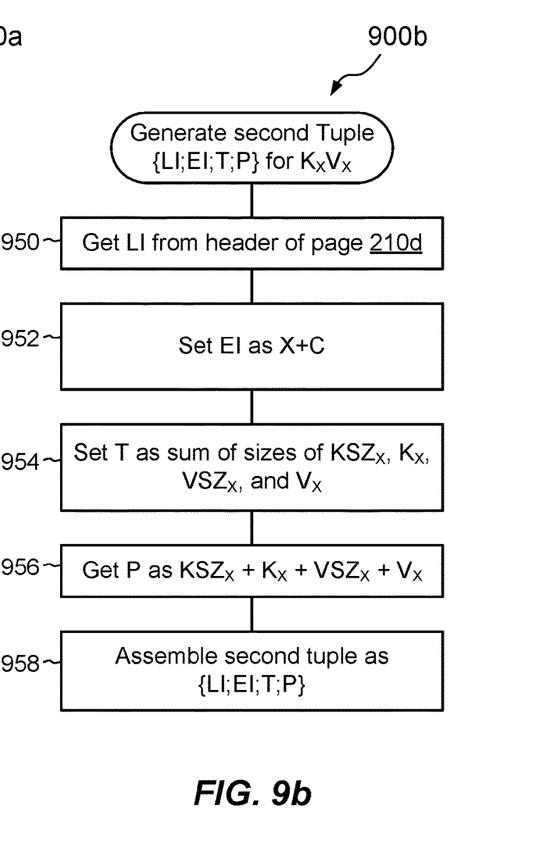

Given the arrangement of page 210d, generating corresponding changes in the K-V log 170 involves creating two delta records 172, i.e., one delta record for the first entry and another delta record for the second entry. FIGS. 9a and 9b show example methods for creating such delta records.

FIG. 9a shows an example method 900a for creating a first delta record 172 that corresponds to the first entry used for storing a K-V pair $K_X V_X$. As before, creating the first delta record involves generating a first tuple {LI; EI; T; P} for $K_X V_X$. The first entry falls within the first plurality of regions 830 of uniform size.

At 910, the node 120a obtains the LI for the first delta record from the header of page 210d. At 912, node 120a sets the EI simply as "X", i.e., the ordinal position of the $X^{th}$ K-V pair in page 210d. At 914, the size T is set to the size of $Offset_X$. As regions in the first plurality of regions 830 are uniform in size, T may be the same for all entries in the first plurality of regions 830. At 916, node 120a obtains the payload P as $Offset_X$. At 918, the desired tuple describing the first delta record is assembled based on the determined values of LI, EI, T, and P.

FIG. 9b shows an example method 900b for generating the second delta record corresponding to the second entry used to store the K-V pair $K_X Y_X$ in page 210d, e.g., by generating a second tuple {LI; EI; T; P}. At 950, node 120a obtains the LI from the header of page 210d. At 952, node 120a sets the EI to X+C, where C is the above-described constant, such as L/2. Thus, the EI of the second delta record is just the EI of the first delta record plus C. At 954, the size T is set to the sum of the sizes of $KSZ_X$, $K_X$, $VSZ_X$, and $V_X$. At 956, the payload is set to $KSZ_X + K_X + VSZ_X + V_X$. At 958, the desired second tuple describing the second delta record is assembled based on the determined values of LI, EI, T, and P. As before, the first and second delta records may be written to the K-V log 172 as related delta records and preferably in an order that enables the first entry to be rebuilt prior to the second entry. The acts of methods 900a and 900b may be carried out in any suitable order.

The arrangement of page 210d may be regarded as a single-reference example, as the entries in the first domain 820 have only a single reference to the respective keys and values in the second domain 822. However, a double-reference approach may also be used.

Figure 10:
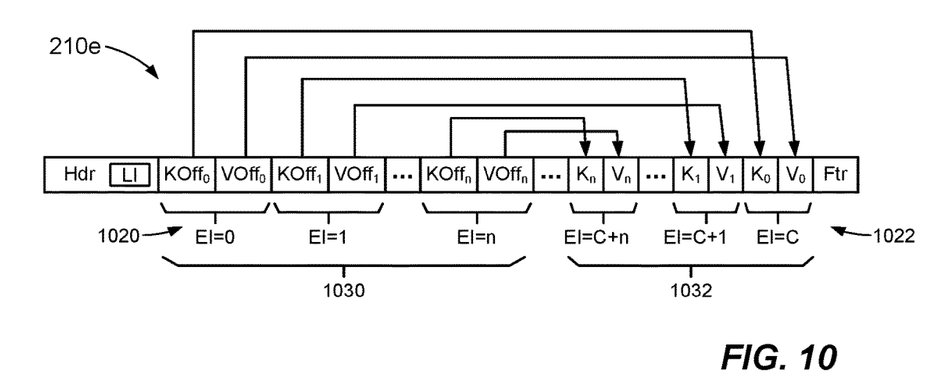
FIG. 10 is a block diagram of a second example metadata page in which key-value data is laid out for variable-length keys and variable-length values.

FIG. 10 shows a second example arrangement in which a page 210e is configured to store K-V pairs having variable-length keys and variable-length values, this time according to a double-reference approach. Such K-V pairs may not fit into fixed-length regions like those shown in FIG. 2. As in FIGS. 4, 6, and 8, the placement of variable-length K-V pairs is addressed by providing two entries for each K-V pair, a first entry that is fixed in length and a second entry that is variable. The first entry includes a reference to a location of the second entry within the page 210e. The first entry has an entry index that falls within a first domain 1020 of entry indices, and the second entry has an entry index that falls within a second domain 1022 of entry indices. The first and second domains of entry indices 1020 and 1022 are discontinuous and non-overlapping.

The first domain 1020 of entry indices is provided within a first plurality of regions 1030, and the second domain 1022 of entry indices is provided within a second plurality of regions 1032. One entry may be provided per region.

As shown, a first entry in the first domain 1020 may include both a key offset ($KOff_X$) and a value offset ($VOff_X$), which point, respectively, to a key $K_X$ and a value $V_X$ found in a corresponding second entry in the second domain 1022. As separate offsets are provided for keys and values, no separate size information about keys or values is needed (sizes may be inferred from offsets).

Figure 11A:
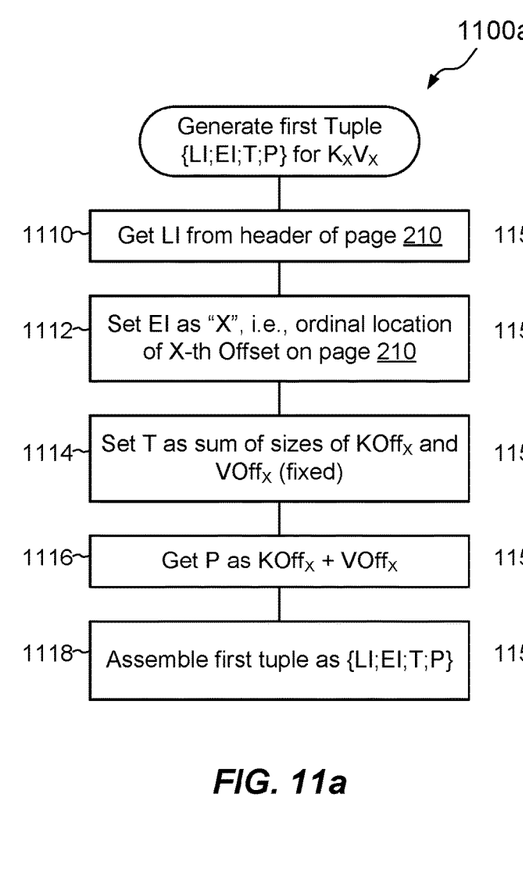
FIGS. 11a and 11b are flowcharts that show example methods of creating delta records from the metadata page of FIG. 10.
Figure 11B:
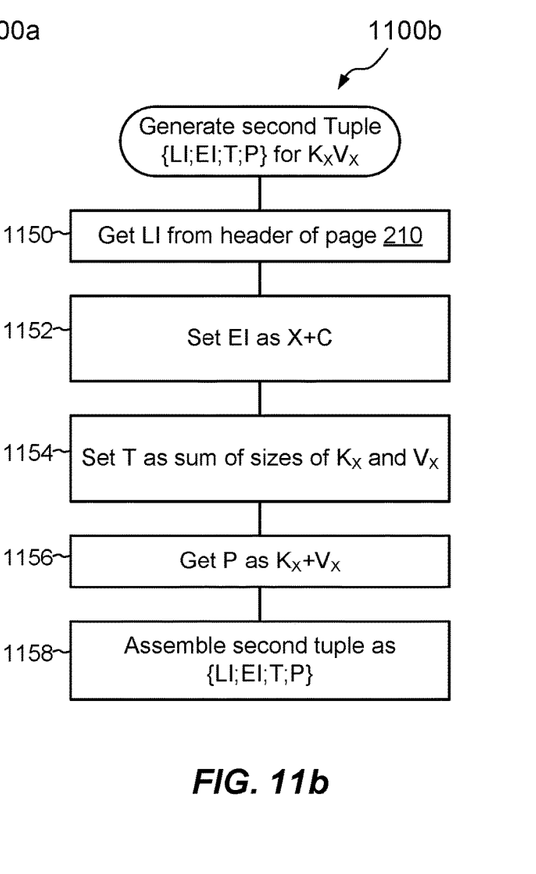

Given the arrangement of page 210e, generating changes in the K-V log 170 involves creating two delta records 172, i.e., one delta record for the first entry and another delta record for the second entry. FIGS. 11a and 11b show example methods for creating such delta records.

FIG. 11a shows an example method 1100a for creating a first delta record 172 that corresponds to the first entry used for storing a K-V pair $K_XV_X$. As before, creating the first delta record involves generating a first tuple {LI; EI; T; P} for $K_XV_X$. The first entry falls within the first plurality of regions 1030 of uniformly size.

At 1110, node 120a obtains the LI for the first delta record from the header of page 210e. At 1112, node 120a sets the EI simply as "X", i.e., the ordinal position of the $X^{th}$ K-V pair in page 210e. At 1114, the size T is set to the sum of the sizes of $KOff_X$ and $VOff_X$. As regions in the first plurality of regions 1030 are uniform in size, T may be the same for all entries in the first plurality of regions 1030. At 1116, node 120a obtains the payload P as $KOff_X+VOff_X$. At 1118, the desired tuple describing the first delta record is assembled based on the determined values of LI, EI, T, and P.

FIG. 11b shows an example method 1100b for generating the second delta record corresponding to the second entry used to store the K-V pair $K_XY_X$ in page 210e, e.g., by generating a second tuple {LI; EI; T; P}. At 1150, node 120a obtains the LI from the header of page 210e. At 1152, node 120a sets the EI to X+C, where C is the above-described constant, such as L/2. Thus, the EI of the second delta record is just the EI of the first delta record plus C. At 1154, the size T is set to the sum of the sizes of $K_X$ and $V_X$. At 1156, the payload is set to $K_X+V_X$. At 1158, the desired second tuple describing the second delta record is assembled based on the determined values of LI, EI, T, and P. As before, the first and second delta records may be written to the K-V log 172 as related delta records and preferably in an order that enables the first entry to be rebuilt prior to the second entry. The acts of methods 1100a and 1100b may be carried out in any suitable order.

Figure 12:
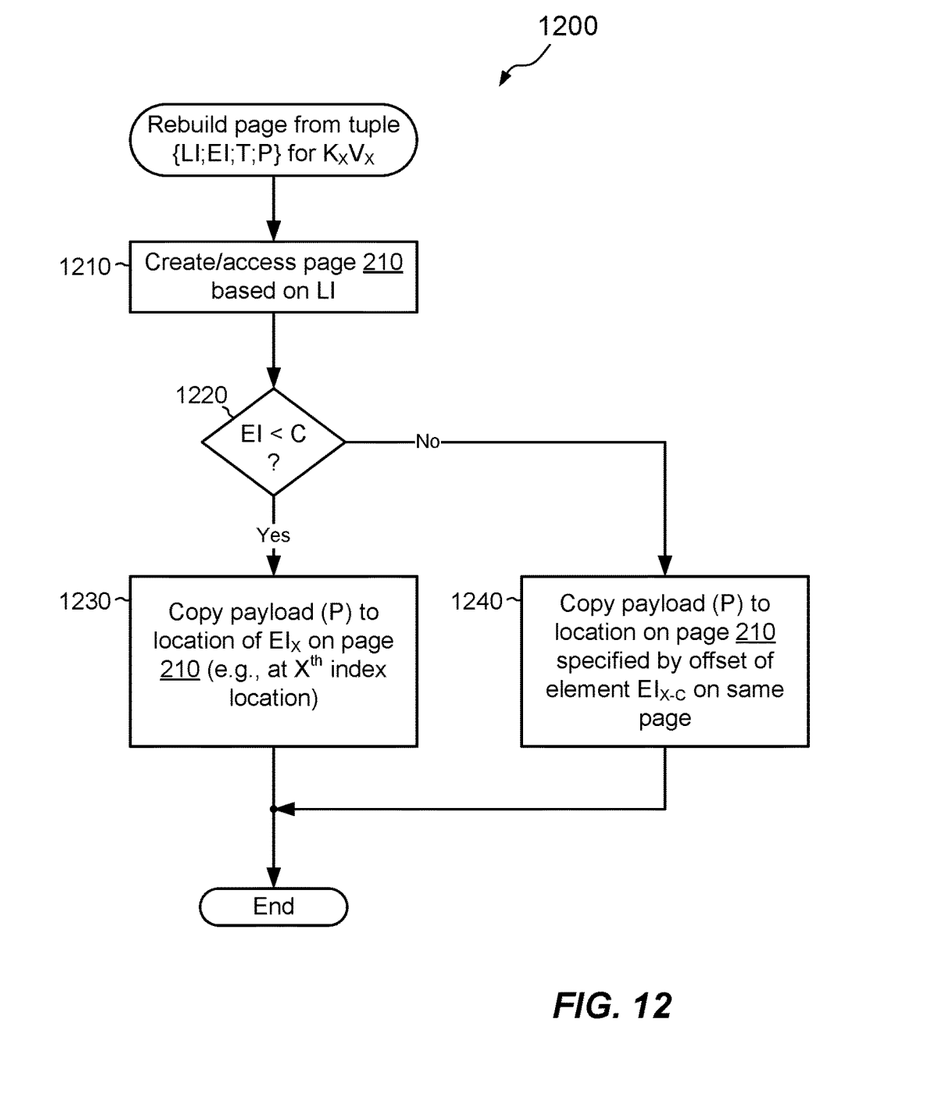
FIG. 12 is a flowchart that shows an example method of rebuilding a metadata page from a pair of delta records.

FIG. 12 shows an example method 1200 that may be used to rebuild a metadata page from a pair of delta records 172. The method 1200 may be used to rebuild any of the metadata pages shown in FIGS. 4, 6, 8, and 10. Operation begins based on a first tuple {LI; EI; T; P} provided for a K-V pair $K_XV_X$. It is assumed that the first tuple is one of two tuples provided for two delta records 172 that record $K_XV_X$ in the K-V log 170. Rebuilding the page 210 thus involves rebuilding both a first entry, corresponding to the first tuple, and a second entry, corresponding to the second tuple.

At 1210, a metadata page 210 for $K_XV_X$ is created based on the LI specified in the first tuple {LI; EI; T; P}. For example, node 120a may locate the bucket 160 that contains recent versions of the metadata page corresponding to the LI of the first tuple and may create a new version of that metadata page within the bucket.

At 1220, node 120a accesses the entry index EI from the tuple and compares it with the constant C described above, where C may be half the length of the metadata page, for example. If EI is less than C, then the obtained EI is assumed to correspond to the first domain in which EI values represent ordinal positions of fixed-length entries in the page.

Operation then proceeds to 1230, whereupon the first entry is rebuilt by copying the payload P of the first tuple to the metadata page at the location of the entry index ($EI_X$) specified by the EI of the tuple. Method 1200 then ends, as rebuilding of the first entry is complete.

The method 1200 is then repeated for rebuilding the second entry from the second tuple. At 1210 the same metadata page that was created above is accessed, and at 1220 a comparison is made between EI as read from the second tuple and the constant C. If EI is greater than C (as expected for entries in the second domain), operation proceeds to 1240, whereupon the second entry is rebuilt by copying the payload P to a location within the metadata page specified in the reference (such as the offset) contained in the first entry. The first entry may be easily located as $EI_{X-C}$, which resides in the first domain where entries are laid out consecutively in fixed-length regions. Operation then ends, as both entries of the metadata page have been rebuilt.

Figure 13:
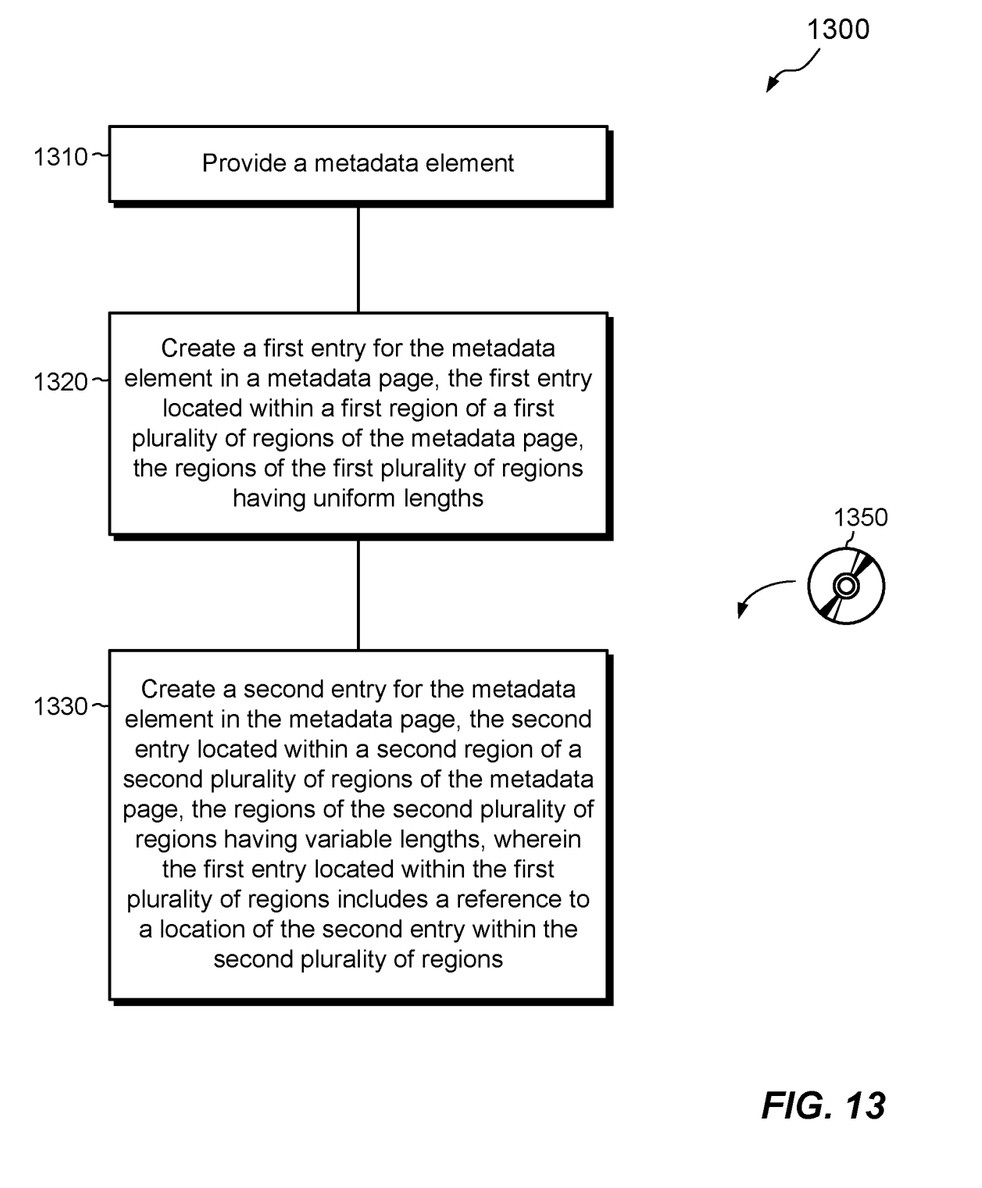
FIG. 13 is a flowchart that shows an example method of managing metadata of variable length.

FIG. 13 shows an example method 1300 of managing metadata of variable length and provides a summary of some of the features described above. The method 1300 may be carried out in connection with the environment 100 and may be performed, for example, by the software constructs described in connection with FIG. 1, which reside in the memory 130 of the node 120a and are run by the set of processors 124. The various acts of method 1300 may be ordered in any suitable way. Accordingly, embodiments may be constructed in which acts are performed in orders different from that illustrated, which may include performing some acts simultaneously.

At 1310, a metadata element is provided. For example, the metadata element may be a key-value pair indicated by a key-value change 152 generated by KVE 150.

At 1320, a first entry (e.g., EI=X) is created for the metadata element in a metadata page 210. The first entry is located within a first region of a first plurality of regions (e.g., 430, 630, 830, or 1030) of the metadata page 210. The regions of the first plurality of regions have uniform length.

At 1330, a second entry (e.g., EI=X+C) is created for the metadata element in the metadata page 210. The second entry is located within a second region of a second plurality of regions (e.g., 432, 632, 832, or 1032) of the metadata page 210. The regions of the second plurality of regions have variable lengths. The first entry located within the first plurality of regions includes a reference (e.g., $ValOffset_X$, $KOffset_X$, $Offset_X$, $KOff_X$, and/or $VOff_X$) to a location of the second entry within the second plurality of regions.

An improved technique has been described for managing metadata of variable length. The technique includes responding to the creation or change in a metadata element by creating at least first and second entries within a metadata page 210 at discontinuous locations. The first entry is located among a first set of regions having uniform length and includes a reference to the second entry, which is located among a second set of regions having variable length. In this manner, the metadata element that does not fit within a fixed-size space is accommodated by multiple discontinuous entries in respective sets of regions.

Having described certain embodiments, numerous alternative embodiments or variations can be made. For example, although the metadata elements are described above as key-value pairs, this is merely an example, as the same principles may apply to other types of metadata or data.

Further, embodiments have been described in which both keys and values of K-V pairs are written to metadata pages 210 and delta records 172. In some examples, however (such as those involving space accounting), it is necessary only to write values, as keys may remain unchanged. In such cases, an update can be achieved by writing only a single entry that contains a new value. Likewise, a page can be rebuilt just by restoring the page from a single delta record that contains the new value, rather than having to restore from two delta records. Such an arrangement further promotes write amortization.

Figure 14:
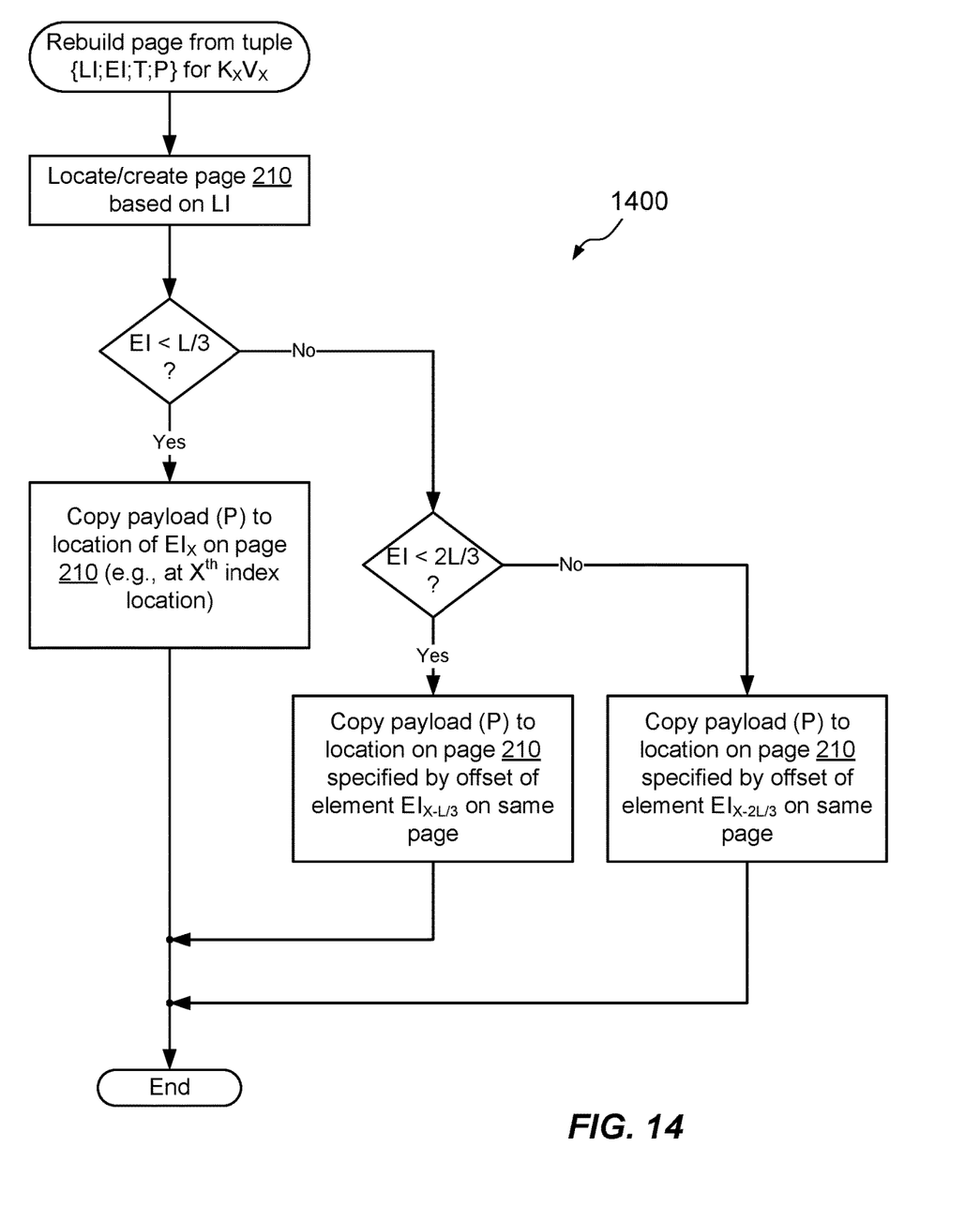
FIG. 14 is a flowchart that shows an example method of recreating a metadata page from three delta records.

Also, embodiments have been described in which entry indices are provided in two discontinuous domains within a metadata page 210. However, embodiments are not limited to two discontinuous domains. For instance, FIG. 14 shows an example method 1400 in which three distinct domains of entry indices are provided. A first domain may include entry indices ranging from 0 to L/3-1 (or some other constant), as second domain may include entry indices ranging from L/3 to 2 L/3-1 (or some other constant larger than the previous one), and a third domain may include indices ranging from 2 L/3 to L. The first domain may include index records, the second domain may include payloads containing new data for both keys and values, and the third domain may include payloads containing new data for values only. As there are three domains, the arrangement of FIG. 14 supports metadata pages with up to three entries per K-V pair based on up to three delta records. The method 1400 may be performed once for each of the three delta records.

Although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 1350 in FIG. 13). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing metadata of variable length, comprising:
providing a metadata element;
creating a first entry for the metadata element in a metadata page, the first entry located within a first region of a first plurality of regions of the metadata page, the regions of the first plurality of regions having uniform length; and
creating a second entry for the metadata element in the metadata page, the second entry located within a second region of a second plurality of regions of the metadata page, the regions of the second plurality of regions having variable length, wherein the first entry located within the first plurality of regions includes a reference to a location of the second entry within the second plurality of regions.

2. The method of claim 1, further comprising updating a transaction log to record the change in the metadata element, said updating including creating a first delta record based on the first entry and creating a second delta record based on the second entry.

3. The method of claim 2,
wherein creating the first delta record includes storing a first set of elements that includes at least a logical identifier (LI) of the metadata page and an entry identifier (EI) of the first entry within the metadata page, the EI of the first entry based on an ordinal position of the first region within the first plurality of regions, and
wherein creating the second delta record includes storing a second set of elements that includes at least a logical identifier (LI) of the metadata page and an entry identifier (EI) of the second entry within the metadata page, the EI of the second entry based on the ordinal position of the first region within the first plurality of regions.

4. The method of claim 3, wherein the EI of the second entry is equal to the EI of the first entry plus a predetermined constant.

5. The method of claim 4, wherein the predetermined constant is based at least in part on a length of the metadata page.

6. The method of claim 3,
wherein storing the first set of elements includes storing a first payload that contains the reference to the second entry, and
wherein storing the second set of elements includes storing a second payload that contains (i) a variable-size portion of the metadata element and (ii) a size of the variable-size portion of the metadata element.

7. The method of claim 3, further comprising rebuilding the metadata page from the first delta record and the second delta record.

8. The method of claim 3, wherein the metadata element includes a key-value pair, and wherein creating the first entry in the metadata page includes storing a key of the key-value pair and an offset that points to the second entry, the second entry including a value of the key-value pair and a size of the value of the key-value pair.

9. The method of claim 3, wherein the metadata element includes a key-value pair, and wherein creating the first entry in the metadata page includes storing a value of the key-value pair and an offset that points to the second entry, the second entry including a key of the key-value pair and a size of the key of the key-value pair.

10. The method of claim 3, wherein the metadata element includes a key-value pair, and wherein creating the first entry in the metadata page includes storing an offset that points to the second entry, the second entry including a key of the key-value pair, a size of the key of the key-value pair, a value of the key-value pair, and a size of the value of the key-value pair.

11. The method of claim 3, wherein the metadata element includes a key-value pair, and wherein creating the first entry in the metadata page includes (i) storing a key offset that points to a key of the key-value pair in the second entry and (ii) storing a value offset that points to a value of the key-value pair in the second entry.

12. A computerized apparatus, comprising control circuitry that includes a set of processors coupled to memory, the control circuitry constructed and arranged to:
provide a metadata element;
create a first entry for the metadata element in a metadata page, the first entry located within a first region of a first plurality of regions of the metadata page, the regions of the first plurality of regions having uniform length; and
create a second entry for the metadata element in the metadata page, the second entry located within a second region of a second plurality of regions of the metadata page, the regions of the second plurality of regions having variable length, wherein the first entry located within the first plurality of regions includes a reference to a location of the second entry within the second plurality of regions.

13. A computer program product including a set of non-transitory, computer-readable media having instructions which, when executed by control circuitry of a computerized apparatus, cause the computerized apparatus to perform a method of managing metadata of variable length, the method comprising:
providing a metadata element;
creating a first entry for the metadata element in a metadata page, the first entry located within a first region of a first plurality of regions of the metadata page, the regions of the first plurality of regions having uniform length; and
creating a second entry for the metadata element in the metadata page, the second entry located within a second region of a second plurality of regions of the metadata page, the regions of the second plurality of regions having variable length, wherein the first entry located within the first plurality of regions includes a reference to a location of the second entry within the second plurality of regions.

14. The computer program product of claim 13, wherein the method further comprises updating a transaction log to record the change in the metadata element, said updating including creating a first delta record based on the first entry and creating a second delta record based on the second entry.

15. The computer program product of claim 14,
wherein creating the first delta record includes storing a first set of elements that includes at least a logical identifier (LI) of the metadata page and an entry identifier (EI) of the first entry within the metadata page, the EI of the first entry based on an ordinal position of the first region within the first plurality of regions, and
wherein creating the second delta record includes storing a second set of elements that includes at least a logical identifier (LI) of the metadata page and an entry identifier (EI) of the second entry within the metadata page, the EI of the second entry based on the ordinal position of the first region within the first plurality of regions.

16. The computer program product of claim 15, wherein the EI of the second entry is equal to the EI of the first entry plus a predetermined constant.

17. The computer program product of claim 15, wherein the metadata element includes a key-value pair, and wherein creating the first entry in the metadata page includes storing a key of the key-value pair and an offset that points to the second entry, the second entry including a value of the key-value pair and a size of the value of the key-value pair.

18. The computer program product of claim 15, wherein the metadata element includes a key-value pair, and wherein creating the first entry in the metadata page includes storing a value of the key-value pair and an offset that points to the second entry, the second entry including a key of the key-value pair and a size of the key of the key-value pair.

19. The computer program product of claim 15, wherein the metadata element includes a key-value pair, and wherein creating the first entry in the metadata page includes storing an offset that points to the second entry, the second entry including a key of the key-value pair, a size of the key of the key-value pair, a value of the key-value pair, and a size of the value of the key-value pair.

20. The computer program product of claim 15, wherein the metadata element includes a key-value pair, and wherein creating the first entry in the metadata page includes (i) storing a key offset that points to a key of the key-value pair in the second entry and (ii) storing a value offset that points to a value of the key-value pair in the second entry.

* * * * *